Figure 1:
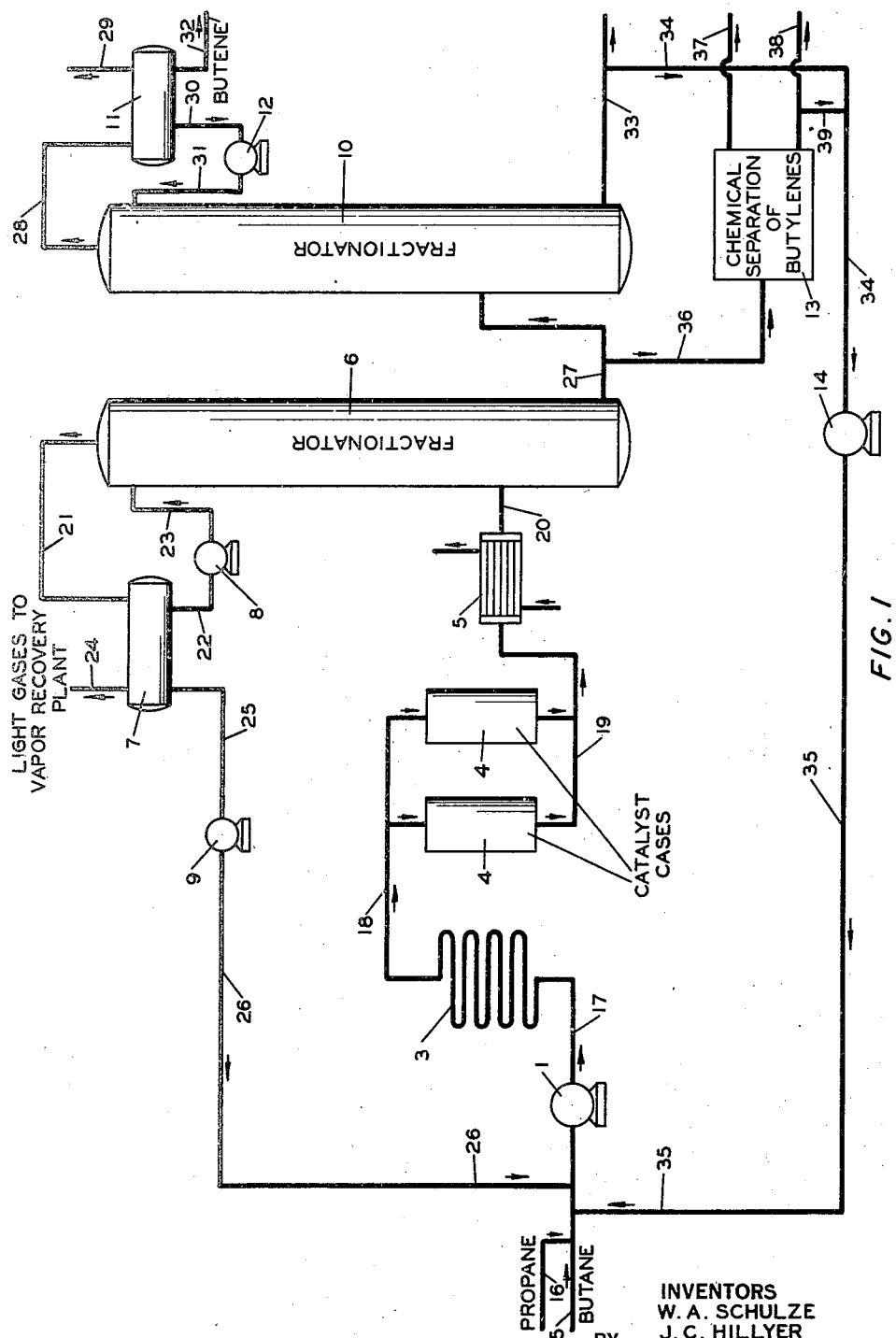

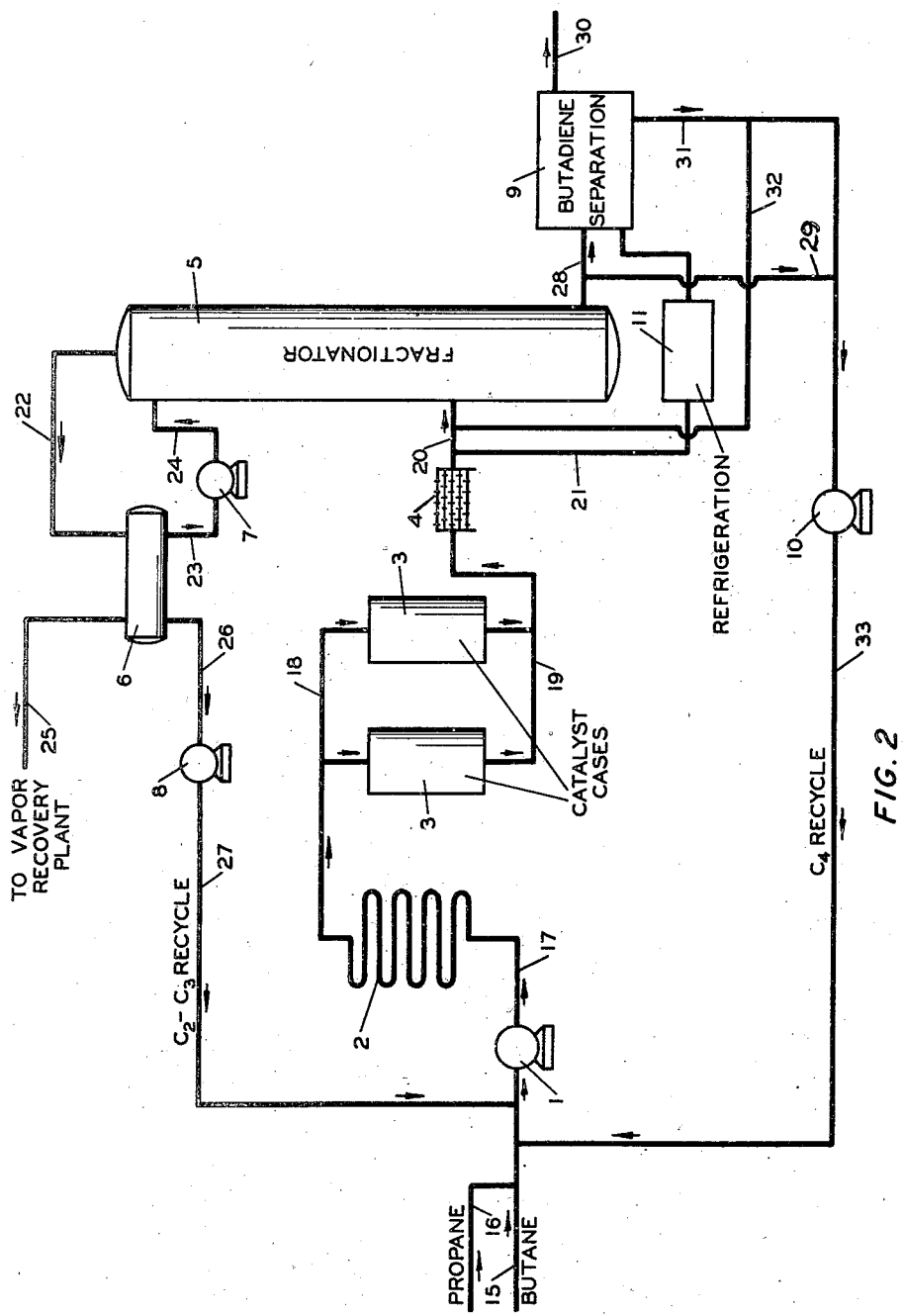

Patented Jan. 16, 1945

2,367,621

UNITED STATES PATENT OFFICE 2,367,621

PROCESS FOR DEHYDROGENATION OF HYDROCARBONS

Walter A. Schulze and John C. Hillyer, Bartlesville, Okla., assignors to Phillips Petroleum Company, a corporation of Delaware Application August 23, 1940, Serial No. 353,960

9 Claims. (Cl. 260—680)

This invention relates to an improved process for the catalytic dehydrogenation of hydrocarbons to produce olefins and diolefins of the same number of carbon atoms. More specifically it relates to an improved process for the dehydrogenation of normal butane or butenes or mixtures thereof under superatmospheric pressures.

In the operation of processes for the dehydrogenation of hydrocarbons it has heretofore been customary to employ very low pressures because of the unfavorable effect of pressure on the dehydrogenation reactions. Thus, while moderate pressures of 50 to 60 pounds gage are desirable to maintain the flow of reactants through the catalytic treating equipment, even these low pressures are responsible for reduced yields in the dehydrogenation of normal butane. The dehydrogenation of olefins to produce diolefins is even more sensitive to the unfavorable effect of pressure on the equilibrium in the dehydrogenation reaction.

Another deleterious effect of pressure is the increased formation of polymers from the unsaturated hydrocarbons. Such polymerization results in product losses, and in addition, the polymers themselves are readily cracked to produce tar and/or coke which rapidly poison or deactivate the catalyst. In this connection, the dehydrogenation of olefins to diolefins is more seriously affected by pressure because of the higher concentration of unsaturated hydrocarbons including the more reactive diolefins.

In a process for the dehydrogenation of the normally gaseous hydrocarbons, particularly normal butane, comprising the conventional steps of heating the charge, passing it through catalyst chambers at elevated temperatures and at pressures of one to four atmospheres, the processing of the effluent gases at low pressure introduces difficult operating problems. After the separation of any heavy polymer, the gas stream comprises hydrogen and hydrocarbons ranging from the original charge down through methane. The separation of hydrogen and fixed gases and the segregation of dehydrogenated products and a suitable recycle stock involve expensive processing steps such as an oil-absorption and stripping treatment for the recovery of the desired hydrocarbons.

An alternate method of processing the effluent vapors involves sufficient compression and cooling to liquify the higher-boiling components. By this procedure, the fixed gases may be separated, and a high-pressure fractional distillation used to separate the liquid hydrocarbons as desired. Thus, in the dehydrogenation of normal butane, the effluent vapors must be compressed to about 300 pounds gage or higher at temperatures in the range of 80–100° F. (ordinary cooling water temperatures), whereby hydrogen and methane are separated as gases from the liquid hydrocarbons. The liquid may then be fractionated, using the desired amount of liquid propane or equivalent reflux to separate the $C_4$ hydrocarbons from the lower-boiling components of the liquid. If in the compression and fractionation steps, lower temperatures are maintained by refrigeration, somewhat lower pressures may be used. However, to eliminate entirely the compression step, pressures of 200 to 400 pounds gage are necessary at the heater and catalyst chambers during the dehydrogenation, and these relatively high pressures have heretofore been considered unfeasible.

An object of this invention is a process for dehydrogenating butane and/or butenes under sufficient pressure to operate subsequent fractionation steps directly without intermediate compression.

Another object of the invention is a process for dehydrogenating butane and/or butenes under pressure without the considerable deleterious effect upon the equilibrium ordinarily caused by the use of pressure.

A further object of this invention is to supply for the most part the endothermal heat required for the catalytic dehydrogenation reaction in the form of the available sensible heat of a refractory hydrocarbon diluent which is substantially unconverted at reaction conditions.

We have now found that by the addition of a major proportion of a refractory hydrocarbon, usually the lower-boiling paraffins or the exceedingly heat-stable aromatic hydrocarbons, we are able to operate the dehydrogenation of $C_4$ hydrocarbons under desirable high total pressures. By this means we are able to maintain the partial pressure of butane, for example, at desirable low values such as about 0.5 to four atmospheres during dehydrogenation and thereby obtain increased dehydrogenation with lower material losses while at the same time having total pressures high enough to operate a subsequent fractionation of the effluents without intermediate compression.

We have discovered in the application of our new process to the dehydrogenation of $C_4$ hydrocarbon that propane or a reasonable close-cut $C_3$ fraction is the hydrocarbon material most suitable for addition to the $C_4$ charge stock. Propane is particularly suitable because it can be condensed and separated by fractionation at total pressures usually below 350 pounds gage at ordinary temperatures and the dilution of the C₄ charge stock to give the desired partial pressure is not excessive. Thus, with total pressures between 250 and 350 pounds gage, the concentrations of butane corresponding to a partial pressure of 0.5 to two atmospheres vary between 2 and 11 volume per cent. The use of a mild refrigeration to obtain lower temperatures in the condensation and fractionation steps permits the use of lower total pressures down to about 200 pounds gage, and consequently butane concentrations of 3.5 to about 15 volume per cent are possible within the above-mentioned partial pressure range.

In many applications hydrocarbon mixtures comprising ethane and propane may be used instead of propane, with the proportions of ethane controlled so as to maintain desirable total pressures in the system. When the diluent contains ethane somewhat higher total pressures may be required with somewhat lower concentrations of butane necessary as a consequence. Within the desired pressure range, increasing amounts of ethane may be included with propane when mild refrigeration is applied.

We have also found that the propane diluent is relatively refractory and thus only a minor amount is dehydrogenated at the conditions chosen for dehydrogenating butane. Thus dehydrogenation is substantially restricted to the C₄ hydrocarbons which constitute a minor proportion of the material passing through the catalyst chambers. Under these conditions, the sensible heat of the propane is available to supply the endothermal heat of the dehydrogenation reaction with the result that the catalyst may be maintained within the desired temperature range without any superheating of the untreated vapors and without the application of heat from an external source. This function of the propane as a source of endothermal heat to the catalyst is of great importance since optimum operating temperatures are closely maintained.

In one specific embodiment of the invention normal butane and propane are charged together to a heater and subsequent catalyst cases in such proportion as to maintain the partial pressure of butane in the range of about 0.5 to three atmospheres while the total pressure is in the range 250 to 350 pounds gage, or stated otherwise, a concentration of about 2 to 15 per cent by volume of butane is used. After passing through the catalyst cases maintained at elevated temperature, in which a substantial dehydrogenation of butane to form butenes occurs, the effluent gas is cooled and the propane and light gases are separated from the C₄ fraction in a fractionating column. The propane thus recovered is recycled continuously, and the butane-butene fraction obtained from the column is subjected to separation, after which the butane and usually also a part of the butenes is continuously recycled. Either butene-1 or a mixture of butenes, depending on the separation step, is the product which is formed with substantially smaller losses of C₄ charge than normally experienced.

The process may be more readily understood by reference to the drawing Figure 1. In the figure pump 1 takes butane admitted through line 15 and propane through line 16 and delivers the proportioned mixture through line 17 to heater 3 at the desired pressure. The mixture is heated in coil 3 to the desired temperature and passes to catalyst chambers 4 through line 18. The effluent gas leaving the chambers through line 19 is cooled in coolers 5 which may consist of one or many heat exchangers, condensers and the like as may be required. A polymer separator (not shown) may be included ahead of the condenser if desired. The effluents pass through line 20 to fractionating column 6 where the light gases and propane are removed overhead through line 21 and the C₄ hydrocarbons are removed from the bottom of the column by line 27. Propane reflux is condensed and collected in accumulator 7, from which light gases are vented through line 24, and ordinarily pass to a vapor recovery system. Reflux is returned to the column through lines 22 and 23 and pump 8. The excess reflux comprising propane is recycled through lines 25 and 26, and pump 9 to the charge pump along with make-up propane from line 16. The C₄ fraction from line 27 enters a second fractionating column 10 operating at lower pressure in which butene-1 is separated overhead from the bottom fraction comprising butene-2 and butane. The column 10 is equipped with reboiler and reflux cooler (not shown). Butene-1 leaving the column by line 28 is condensed and collected in accumulator 11. The excess reflux liquid is taken through line 32, while reflux to the column is returned through lines 30 and 31 and pump 12. The bottom fraction from column 10 may be removed through line 33, or as would normally be the case, through lines 34 and 35 and pump 14 to the intake of the charge pump as recycle.

Alternately, the C₄ fraction from the bottom of column 6 can be removed through line 36 to a separator 13 utilizing a chemical process for the extraction of butenes. Butenes would then be removed through line 37 and butane through either line 38 to storage or through line 39 to the recycle line 34.

Butene-1 or mixed butenes may be the desired products of the process outlined or they may be utilized in a subsequent stage of an integrated process such as dehydrogenation to produce butadiene.

For the conversion of butane to butenes we ordinarily use temperatures in the above-described operation within the range of 1000 to 1200° F. Space velocities of reactants over the catalyst are regulated to produce suitable conversion without undue losses due to decomposition reaction. Usually flow rates corresponding to 0.5 to 10 liquid volumes of charge per hour per volume of catalyst are employed when operating at pressures of 250 to 350 pounds gage.

Some loss of both butane and propane occurs through splitting reactions, but loss of butane or butenes through such reactions is minimized by our process of operation with the result that the ultimate or recycle yield, is greatly improved. Periodically catalyst activity drops below economic levels, whereupon we practice regeneration of the catalyst by means of burning out under carefully controlled conditions with a stream of air or other oxygen-containing gas.

We have further discovered that our invention may be applied to a single stage process for the production of butadiene from butane. In such an embodiment, butane admixed with a major proportion of propane or its equivalent is heated and passed over a dehydrogenation catalyst as described above. The effluent gases are cooled to condense the higher boiling components, and the gas-condensate mixture is fractionated at system pressure to separate the fixed gases and hydrogen and as large a percentage of the propane as is desired from the C₄ hydrocarbons. The butadiene formed is separated from the C₄ fraction and the residual liquid from the butadiene extraction containing butane and butenes is recycled to the catalyst along with fresh butane feed. Propane recovered from the overhead fraction may be recycled with necessary additions of make-up propane. In this manner a butene-rich recycle is built up to substantially equilibrium values at the treating temperature while butane is added to replace butadiene removed.

This process may be more readily understood by reference to the drawing, Figure 2. This represents one form of apparatus in which the invention may be carried out. In the figure, butane and propane enter through lines 15 and 16 respectively to pump 1, and pass through heater 2, catalyst chambers 3 and coolers 4 into fractionating column 5. Propane and lighter material passes overhead through line 22, and propane is accumulated in vessel 6 and recycled through lines 26 and 27 and pump 8 after non-condensed gases are vented through line 25. The bottom fraction from column 5 passes through line 28 to a butadiene extractor 9. Butadiene is separated and removed from the system through line 30. The hydrocarbons leaving the extractor through line 31 are recycled through pump 10 and line 33 to the fresh feed stream.

Alternately the cooled effluent stream from coolers 4 may pass through line 21 to refrigeration unit 11 and into butadiene extractor unit 9 for the extraction of butadiene prior to fractionation. In this case the stream passes from unit 9 through line 31 and line 32 to the fractionation column 5 for the low-temperature separation of propane and lower boiling material as indicated. The bottom fraction from this separation then passes from column 5 through line 29 into line 31 ahead of pump 10.

In the application of our process to the production of butadiene, we prefer to use partial pressures of $C_4$ hydrocarbons in the range of 0.5 to one atmosphere, although the use of higher or lower values does not constitute a departure from our invention. Values within the preferred range are chosen to allow for the higher concentrations of polymerizable unsaturates present during the production of butadiene. It is an advantage in this application to employ a little refrigeration in the fractionation step whereby the desired cut in the $C_3$ fraction of the effluents is made at pressures in the range of 150 to 250 pounds gage and the concentration of $C_4$ hydrocarbons in the vapors at the last-named pressures ranges from two to ten volume per cent.

For the conversion of butenes to butadiene, temperatures in the range of 1100 to 1300° F. are suitable although higher temperatures may be employed on occasion. Flow rates of hydrocarbons over the catalyst are usually regulated to correspond to 0.5 to 10 liquid volumes of charge per hour per volume of catalyst. In this application also, the sensible heat of the refractory diluent is an important source of endothermal heat to the catalyst during the dehydrogenation reaction.

In this single-stage application of our process, a substantially complete separation of $C_3$ from $C_4$ hydrocarbons is not essential since no further fractionating steps are involved. Thus, the amount of propane taken overhead may be regulated to the quantity conforming to complete removal of the lighter hydrocarbons and hydrogen while the remainder of the propane is included in the bottoms fraction and processed with the $C_4$ hydrocarbons.

The catalysts which are useful in the practice of our invention in any of its applications are those of satisfactory dehydrogenating activity at the temperatures specified. These may include suitable mineral and/or synthetic catalysts such as natural or synthetic metal oxide catalysts, principally oxides of metals of groups III to VII inclusive of the Periodic Table either alone or in mixtures with each other or supported on suitable carrier materials.

One or a plurality of catalyst chambers may be used. We prefer to use a plurality to allow continuous treating while the catalyst chambers containing spent catalyst are being recharged or regenerated. The chambers are best constructed with shallow beds to minimize pressure drop through the bed, and the consequent large area may be divided among a plurality of cases as desired.

When the activity of a catalyst declines in use due to the deposition of heavy tar and coke, the activity may be satisfactorily restored by regeneration. This is accomplished by passing air or other oxygen-containing gas through the heated catalyst mass whereby the carbonaceous residues are removed by controlled combustion.

The following examples will serve to illustrate more fully results which may be obtained by our process in certain of its specific embodiments. However, since the number of examples could be multiplied greatly, the ones given here are merely illustrative, and are in no sense to be construed as limiting the invention.

*Example I*

A mixture of 90 mol per cent propane and 10 mol per cent normal butane at a temperature of about 1110° F. and pressure of 300 pounds gage was passed at a flow rate equivalent to three liquid volumes of the propane-butane feed per hour per volume of catalyst through a catalyst case containing bauxite impregnated with chromium oxide. The mol per cent composition of the effluents from the catalyst case was as follows:

| | |
|---|---|
| Hydrogen | 7.8 |
| Methane | 0.5 |
| Ethane and ethylene | 0.4 |
| Propane and propylene | 83.0 |
| Butylenes and butadiene | 5.5 |
| Butane | 2.8 |

The temperature of the vapors leaving the catalyst base was 1055° F.

The effluents were cooled to condense a major part of the vapors and the stream then entered the fractionating tower operated at a pressure of 260 pounds gage, the column being operated to take more than 95 per cent of the propane overhead. The propane was condensed, the lighter hydrocarbons and hydrogen being substantially separated therefrom. The propane was recycled, no appreciable make-up being required. The kettle product from this fractionator comprising the $C_4$ hydrocarbons was sent to a second column operated at lower pressure. The overhead fraction from this column comprised substantially butene-1. The kettle product consisted of butene-2 and unconverted normal butane was recycled through the dehydrogenation unit along with fresh feed.

An alternative method of operation consisted in taking the $C_4$ hydrocarbon mixture from the kettle of the first fractionation and separating the butenes by chemical means and recycling only the normal butane.

Example II

A mixture comprising 15 per cent normal butane, 83 per cent propane and 2 per cent ethane was passed at a flow rate equivalent to two liquid volumes of the feed per hour per volume of catalyst through a catalyst bed containing bauxite at a temperature of about 1150° F. and a pressure of 250 pounds gage. Under these conditions only a minor proportion of the propane reacted while 70 per cent of the butane was converted, approximately four-fifths to unsaturated $C_4$ hydrocarbons and the balance to hydrocarbons of lower molecular weight. The butylenes and butadiene were separated and the unconverted normal butane recycled.

Example III

A mixture comprising 10 per cent normal butane, 87 per cent propane and 3 per cent ethane was passed at a flow rate equivalent to one liquid volume of the feed per hour per volume of catalyst through a bed of bauxite catalyst at a temperature of about 1180° F. and a pressure of 250 pounds gage. Under these conditions the effluents contained somewhat over one per cent by volume of butadiene. The temperature of the vapors in the catalyst bed was maintained within a very narrow range due to the sensible heat supplied by the propane which was substantially unconverted under these conditions.

The butadiene was separated from the effluents after cooling by selective absorption in cuprous chloride reagent. Then a portion of the hydrogen and $C_1$ and $C_2$ hydrocarbons was separated from the $C_3$ and $C_4$ mixture before the latter was recycled along with fresh normal butane to the heater and catalyst chamber. Under these conditions the feed stock really comprises a mixture of normal butane, butylenes, $C_3$ hydrocarbons, and a selected quantity of lighter gases.

An alternative method of separation of the effluents consisted in separating light gases prior to removal of the butadiene.

While the foregoing specific descriptions have dealt with the treatment of $C_4$ hydrocarbons, we have noted that with certain modifications our process may be operated satisfactorily on hydrocarbons containing five or more carbon atoms. This fact together with the possible variations in equipment design and operations make our invention one of broad scope and general application, to be limited only by the following claims.

We claim:

1. A process for the dehydrogenation of butane which comprises treating butane admixed with a major proportion of a diluent comprising a hydrocarbon material relatively refractory under the conditions of treatment and having a boiling point in the neighborhood of that of propane, at pressures within the range of 200–400 pounds gage with a dehydrogenating catalyst under conditions such that butane conversion is the principal reaction occurring, cooling the effluents to the point of partial condensation without compression and fractionating the resulting liquid to separate the lower-boiling components from the $C_4$ fraction, recycling the fraction comprising substantially diluent freed of fixed gases to the catalyst, treating the $C_4$ fraction to obtain dehydrogenated products therefrom and finally recycling the residual $C_4$ fraction with fresh added butane to the catalytic treatment.

2. A process for the dehydrogenation of butane which comprises treating butane admixed with a major proportion of a lower-boiling hydrocarbon fraction comprising propane at pressures within the range of 200–400 pounds gage with a dehydrogenating catalyst under conditions such that butane conversion is the principal reaction occurring, cooling the effluents to the point of partial condensation without compression and fractionating the resulting liquid to separate the lower-boiling components from the $C_4$ fraction, recycling the fraction comprising substantially propane freed of fixed gases to the catalyst, treating the $C_4$ fraction to obtain dehydrogenated products therefrom and finally recycling the residual $C_4$ fraction with fresh added butane to the catalytic treatment.

3. A process for the dehydrogenation of butane which comprises treating said butane mixed with a lower-boiling hydrocarbon comprising propane in such proportions that the partial pressure of $C_4$ hydrocarbons does not exceed 15 per cent of the total pressure with a dehydrogenating catalyst at temperatures within the range of 1000 to 1200° F. and pressures between 200 and 400 pounds gage, cooling the effluents to the point of partial condensation without compression, fractionating the resulting liquid to separate propane and lower-boiling material from the $C_4$ hydrocarbon fraction, treating the $C_4$ fraction to obtain valuable dehydrogenation products therefrom and finally recycling the residual $C_4$ hydrocarbon fraction and the fraction comprising substantially propane freed of fixed gases to the catalyst along with sufficient added fresh propane and butane to restore the partial pressure ratio of the original charge.

4. A process for the production of butadiene from $C_4$ hydrocarbons which comprises treating same mixed with a lower-boiling hydrocarbon comprising propane in such proportions that the partial pressure of the $C_4$ hydrocarbons does not exceed 15 per cent of the total pressure with a dehydrogenation catalyst at temperatures within the range of 1100 to 1300° F. and pressures between 200 and 350 pounds gage, cooling the effluents to the point of partial condensation without compression, fractionating the resulting liquid into an overhead fraction comprising propane and lighter material and a bottom fraction comprising $C_4$ hydrocarbons, treating the $C_4$ fraction to extract butadiene therefrom and recycling the residual $C_4$ hydrocarbons comprising butane and butenes and the propane fraction freed of fixed gases to the catalyst along with sufficient fresh propane and butane feed to restore the partial pressure ratio of the original charge.

5. In a process for the catalytic dehydrogenation of butane to produce corresponding olefins and diolefins, the step of adding to the butane sufficient lower-boiling hydrocarbons comprising propane to result in a mixture in which the partial pressure of the butane does not exceed 15 per cent of the total pressure within the range of 200 to 400 pounds gage, whereby fractionation of the effluents to produce a propane and lighter fraction and a $C_4$ fraction for further processing may be accomplished without intermediate compression.

6. A process for the catalytic dehydrogenation of $C_4$ hydrocarbons to produce the corresponding olefins and diolefins which comprises treating the feed stock admixed with sufficient lower-boiling hydrocarbons comprising propane to result in a partial pressure of $C_4$ hydrocarbons not exceeding 15 per cent of the total pressure within the range of 200 to 400 pounds gage over a dehydrogenating catalyst under conditions such that the propane is substantially unconverted while a considerable proportion of the C4 hydrocarbon is dehydrogenated, cooling the effluents to the point of partial condensation without compression, fractionating the resulting liquid to produce an overhead fraction comprising propane and a bottom fraction comprising C4 hydrocarbons, recycling the propane fraction freed of fixed gases to the catalyst, treating the C4 fraction to extract dehydrogenated products, and finally recycling the unconverted C4 hydrocarbons to the catalyst.

7. A process for the dehydrogenation of C4 hydrocarbons to produce the corresponding olefins and diolefins which comprises treating the feed stock admixed with a sufficient amount of a highly refractory aromatic hydrocarbon relatively stable during the dehydrogenation to produce a partial pressure of C4 hydrocarbons not exceeding 15 per cent of the total pressure within the range of 200 to 400 pounds gage over a dehydrogenation catalyst under conditions such that a substantial conversion of the C4 hydrocarbons takes place, cooling and partially condensing the effluents without compression, fractionating the resulting liquid to separate fixed gases and material boiling below the C4 range, treating the residue from the fractionation to separate valuable dehydrogenated products therefrom, and finally recycling the unconverted C4 hydrocarbons and the aromatic diluent along with fresh C4 feed to the catalytic treatment.

8. In a process for the dehydrogenation of a butane charge stock for the production of butadiene by contact with a dehydrogenation catalyst at elevated temperatures and pressures, the improvements comprising admixing with said butane charge stock lower-boiling hydrocarbons essentially comprising propane in such proportions that the concentration of butane in the mixture is about 2 to 15 per cent by volume, passing the resulting mixture at pressures within the range of 200-400 pounds gage into contact with a dehydrogenation catalyst under conditions such that at least a portion of the butane is dehydrogenated, cooling the effluents to the point of partial condensation without compression and separating the dehydrogenated products from the resulting liquid condensate.

9. A process for the dehydrogenation of relatively low boiling hydrocarbons to corresponding dehydrogenated products which comprises admixing said low boiling hydrocarbons with a major proportion of a hydrocarbon diluent relatively refractory under the conditions of said dehydrogenation, treating said mixture at pressures within the range of 200-400 pounds gage with a dehydrogenating catalyst under conditions such that at least a portion of the low boiling hydrocarbon is dehydrogenated, cooling the effluents to the point of partial condensation without compression and fractionating the resultant liquid to separate lower boiling components from a fraction containing the low-boiling hydrocarbon and corresponding dehydrogenated products, separating the hydrocarbon diluent from the effluent of the dehydrogenation, recycling the hydrocarbon diluent to the catalyst, treating the said fraction to obtain dehydrogenated products therefrom and recycling the residuum of said fraction to the catalyst for admixture with fresh low boiling hydrocarbon.

WALTER A. SCHULZE.
JOHN C. HILLYER.